US012092393B2

(12) United States Patent
Cebull et al.

(10) Patent No.: US 12,092,393 B2
(45) Date of Patent: Sep. 17, 2024

(54) SYSTEM AND METHOD FOR REMOVING NATURAL GAS LIQUIDS FROM RICH GAS

(71) Applicant: GTUIT, LLC, Billings, MT (US)

(72) Inventors: Brian R. Cebull, Billings, MT (US); Mark Peterson, Helena, MT (US); James L. Haider, Helena, MT (US); Austin Vandelinder, Billings, MT (US); Jackson Haider, Billings, MT (US); Stephen Doll, Big Arm, MT (US); Tim Boelter, Billings, MT (US)

(*) Notice: Subject to any disclaimer, the term of this patent is extended or adjusted under 35 U.S.C. 154(b) by 289 days.

(21) Appl. No.: 17/547,402

(22) Filed: Dec. 10, 2021

(65) Prior Publication Data

US 2022/0196322 A1 Jun. 23, 2022

Related U.S. Application Data

(60) Provisional application No. 63/128,137, filed on Dec. 20, 2020.

(51) Int. Cl.
*B01D 53/00* (2006.01)
*C10L 3/10* (2006.01)
(Continued)

(52) U.S. Cl.
CPC .......... *F25J 1/0022* (2013.01); *B01D 53/002* (2013.01); *C10L 3/10* (2013.01); *F25J 1/0237* (2013.01); *F25J 1/0279* (2013.01); *F25J 2205/30* (2013.01); *F25J 2210/60* (2013.01); *F25J 2210/62* (2013.01); *F25J 2270/902* (2013.01)

(58) Field of Classification Search
CPC ........ F25J 1/0022; F25J 1/0237; F25J 1/0279; F25J 1/00; F25J 1/02; F25J 3/02; B01D 53/002; C10G 5/04; C10G 5/06; C10L 3/10; C10L 3/12
See application file for complete search history.

(56) References Cited

U.S. PATENT DOCUMENTS

| 5,267,449 A | 12/1993 | Kiczek et al. |
| 2008/0148770 A1 | 6/2008 | Migliore et al. |

(Continued)

FOREIGN PATENT DOCUMENTS

| CN | 1067114 A | 12/1992 |
| CN | 2499774 Y | 7/2002 |

(Continued)

*Primary Examiner* — Sharon Pregler
(74) *Attorney, Agent, or Firm* — Antoinette M. Tease

(57) ABSTRACT

A method for removing natural gas liquids from raw natural gas involving the steps of: passing untreated gas through a scrubber to remove liquid droplets and contaminants; delivering the untreated gas to a compressor, which pressurizes the untreated gas to create pressurized gas; passing the pressurized gas through a first aerial cooler to discharge heat to atmosphere; providing a chilled air exchanger and an air chilling unit; chilling air by passing the air through the air chilling unit to create chilled air; delivering the chilled air to the chilled air exchanger; passing the pressurized gas through the chilled air exchanger to cool the pressurized gas to a setpoint to create cooled pressurized gas; and delivering the cooled pressurized gas to a separator to remove liquids from the cooled pressurized gas, thereby creating processed gas. A system having the components listed above.

11 Claims, 6 Drawing Sheets

(51) Int. Cl.
 *F25J 1/00* (2006.01)
 *F25J 1/02* (2006.01)

(56) References Cited

U.S. PATENT DOCUMENTS

2017/0292077 A1* 10/2017 Young ................... F25J 3/0242
2017/0335205 A1* 11/2017 Meyer ..................... C10G 7/00

FOREIGN PATENT DOCUMENTS

| CN | 2766203 Y | 3/2006 |
| CN | 201876055 U | 6/2011 |
| CN | 204240703 U | 4/2015 |
| CN | 107314616 A | 11/2017 |
| CN | 106885448 B | 5/2019 |
| ES | 2355467 B1 | 2/2012 |
| KR | 101462290 81 | 11/2014 |
| WO | WO 2016001852 A1 | 1/2016 |

* cited by examiner

SYSTEM AND METHOD FOR REMOVING NATURAL GAS LIQUIDS FROM RICH GAS

CROSS-REFERENCE TO RELATED APPLICATION

This application claims priority back to U.S. Patent Application No. 63/128,137 filed on Dec. 20, 2020, the contents of which are incorporated herein by reference.

BACKGROUND OF THE INVENTION

1. Field of the Invention

The present invention relates generally to the field of oil and gas production, and more particularly, to a system and method for removing natural gas liquids from rich gas utilizing an air chiller in lieu of a standard water- or liquid-based chiller. The present invention uses air as a chilling media and other gases as the refrigerant.

2. Description of the Related Art

Associated gas is natural gas found in petroleum reservoirs; it is either dissolved in the oil or found in the open space above the reservoir. With advancements in drilling and extraction technologies for the exploration of unconventional reservoirs, untreated natural gas and associated gas (herein referred to as "rich gas" or "unprocessed gas") have become more abundant with increased production of unconventional oil and gas. Depending on the underground formation, rich gas can vary widely in its composition. Rich gas can contain more energy per standard cubic foot than commodity natural gas, which is predominately methane, because it contains longer chain hydrocarbons, also known as heavy hydrocarbons. These components include propane, butanes, pentanes, hexanes and other longer chain hydrocarbons. All of these components contribute to the "richness" of the gas and may also be referred to as natural gas liquids (NGLs).

In some areas, large amounts of rich gas associated with petroleum production are not considered valuable enough to transport to a treatment facility or build equipment to treat the rich gas because of the remoteness of the areas where petroleum extraction often occurs. This rich gas is released as the petroleum is extracted from underground reservoirs where it is at high pressure. In the past, this rich gas was either vented to atmosphere or burnt off through flaring at the wellsite. These flaring practices have received increased scrutiny because there is a tremendous amount energy in the gas that could potentially be used for other beneficial purposes.

Most of the rich gas that is collected as part of oil and gas extraction needs to undergo some sort of treatment process before it can be used for other purposes such as heating, fueling engines, transmission in a sales pipeline, or storage. Rich gas can also be a product of vapor flashing from storage tanks for oil, gasoline, or other volatile hydrocarbon sources. Processing of rich gas is an important step in creating chemical feedstock for the manufacturing of plastics, fuels, and other important organic chemicals. To process rich gas in order to make it useable for engine fuel or other applications, the rich gas stream is often compressed and cooled to condense and separate out the longer chain hydrocarbons. Because this gas is often in remote locations, effective treatment typically must be highly mobile.

Traditional methods for removing NGLs from natural gas have shortcomings with respect to changing inlet gas chemistry and temperature. One such method is the use of direct expansion refrigeration. En direct expansion refrigeration, the media to be cooled is crossed directly with the refrigerant at the evaporator heat exchanger. By crossing the refrigerant directly with the media to be cooled, in this case rich natural gas, the refrigerant is subject to quickly varying heat loads as the incoming natural gas enthalpy varies as a function of gas temperature and chemistry. This quick variation can cause issues for both the refrigeration system and downstream processes relying on stable temperature control of the natural gas. For a refrigeration system, variation in refrigeration load can cause issues such as liquids at the suction of the refrigeration compressor and variations in refrigerant pressure, both of which can cause system shutdowns or failures. For the natural gas and its downstream dependent processes, these variations can result in a variable dewpoint and a variable heating content, which may cause the gas to fall outside of specifications. Traditional methods of correcting these refrigeration issues are expensive and require complex systems to disconnect the refrigerant from the media being cooled.

BRIEF SUMMARY OF THE INVENTION

The present invention is a method for removing natural gas liquids from raw natural gas comprising: passing untreated gas through a scrubber to remove liquid droplets and contaminants; delivering the untreated gas to a compressor, which pressurizes the untreated gas to create pressurized gas; passing the pressurized gas through a first aerial cooler to discharge heat to atmosphere; providing a chilled air exchanger and an air chilling unit; chilling air by passing the air through the air chilling unit to create chilled air; delivering the chilled air to the chilled air exchanger; passing the pressurized gas through the chilled air exchanger to cool the pressurized gas to a setpoint to create cooled pressurized gas; and delivering the cooled pressurized gas to a separator to remove liquids from the cooled pressurized gas, thereby creating processed gas. In a preferred embodiment, the invention further comprises the step of passing the untreated gas through a pressure regulator to reduce pressure of the untreated gas to a setpoint prior to delivery of the untreated gas to the compressor.

In another preferred embodiment, the invention further comprises the step of: wherein the compressor is an oil-flooded screw compressor, separating oil from the pressurized gas to create separated oil and cooling the separated oil via a second aerial cooler. In one embodiment, the air that is chilled in the air chilling unit is atmospheric air. In another embodiment, the air that is chilled in the air chilling unit is contained within ducting and circulated within a closed loop.

In a preferred embodiment, the invention further comprises the step of passing the processed gas through a backpressure valve prior to delivering the processed gas to an end disposition. In another preferred embodiment, the invention further comprises the step of passing the processed gas through a recycle valve that is configured to sense pressure at the scrubber and at an inlet to the compressor and to increase and decrease an opening size of the recycle valve to maintain pressure and flow at the compressor in the event that raw gas quantity is reduced.

In one embodiment, the invention further comprises the step of pumping to storage liquids produced at the scrubber and at the separator. In another embodiment, the invention further comprises the step of pumping to disposal liquids produced at the scrubber and at the separator. Preferably, the invention further comprises the step of controlling the setpoint of the chilled air exchanger by adjusting a setpoint of air chilling unit. In a preferred embodiment, the first aerial cooler comprises a fan, and the invention further comprises the step of controlling the setpoint of the chilled air exchanger by adjusting the speed of the fan of the first aerial cooler.

In a preferred embodiment, the invention is a system for removing natural gas liquids from raw natural gas comprising: a scrubber that is configured to remove liquid droplets and contaminants from untreated gas; a compressor that is configured to pressurize the untreated gas to create pressurized gas; a first aerial cooler that is configured to receive the pressurized gas and discharge heat to atmosphere; an air chilling unit that is configured to create chilled air; a chilled air exchanger that is configured to cool the pressurized gas to a setpoint to create cooled pressurized gas using the chilled air created by the air chilling unit; and a separator that is configured to remove liquids from the cooled pressurized gas, thereby creating processed gas.

DETAILED DESCRIPTION OF INVENTION

A. Overview

The present invention uses compression, aerial cooling, chiller refrigeration, separation, pressure control, and a logic or automation controller to consistently remove NGLs from rich gas. By having consistency in both temperature and pressure at the separation process, a more consistent processed gas is produced for end use. The temperature of the processed gas is controlled by the ability of the refrigeration system to provide a consistent heat sink for the gas at the refrigeration evaporator. In order to disconnect the refrigerant from the media being cooled and to provide a more consistent evaporation process for mechanical refrigeration, a chiller with an intermediary cooling fluid that contacts both the heat exchanger for the media to be cooled and the refrigeration evaporator is used. The chiller is preferably an air chiller instead of a standard water- or liquid-based chiller.

An air chiller is not a typical direct refrigeration system where the refrigerant is expanded directly into a gas-to-gas heat exchanger. Instead, an air chiller uses refrigeration to cool a volume of air that is used as a cooling media for the transfer of heat from the process fluid back to the refrigeration system. The volume of air contained inside this loop will be referred to as the chilled air. In the present invention, this cooling media (the chilled air) is used in lieu of water, glycol, or other liquid heat transfer fluids used in traditional chilling systems. By using air as the cooling media, the present invention is superior to traditional chilling systems as it avoids the cost of other heat transfer fluids, potential freezing of alternate fluids in low ambient conditions, and the negative environmental impacts if there is a leak or loss of containment of some alternate fluids. The system may be open- or closed-loop, depending on the particular application and cost considerations.

B. Detailed Description of the FIGS.

Figure 1:
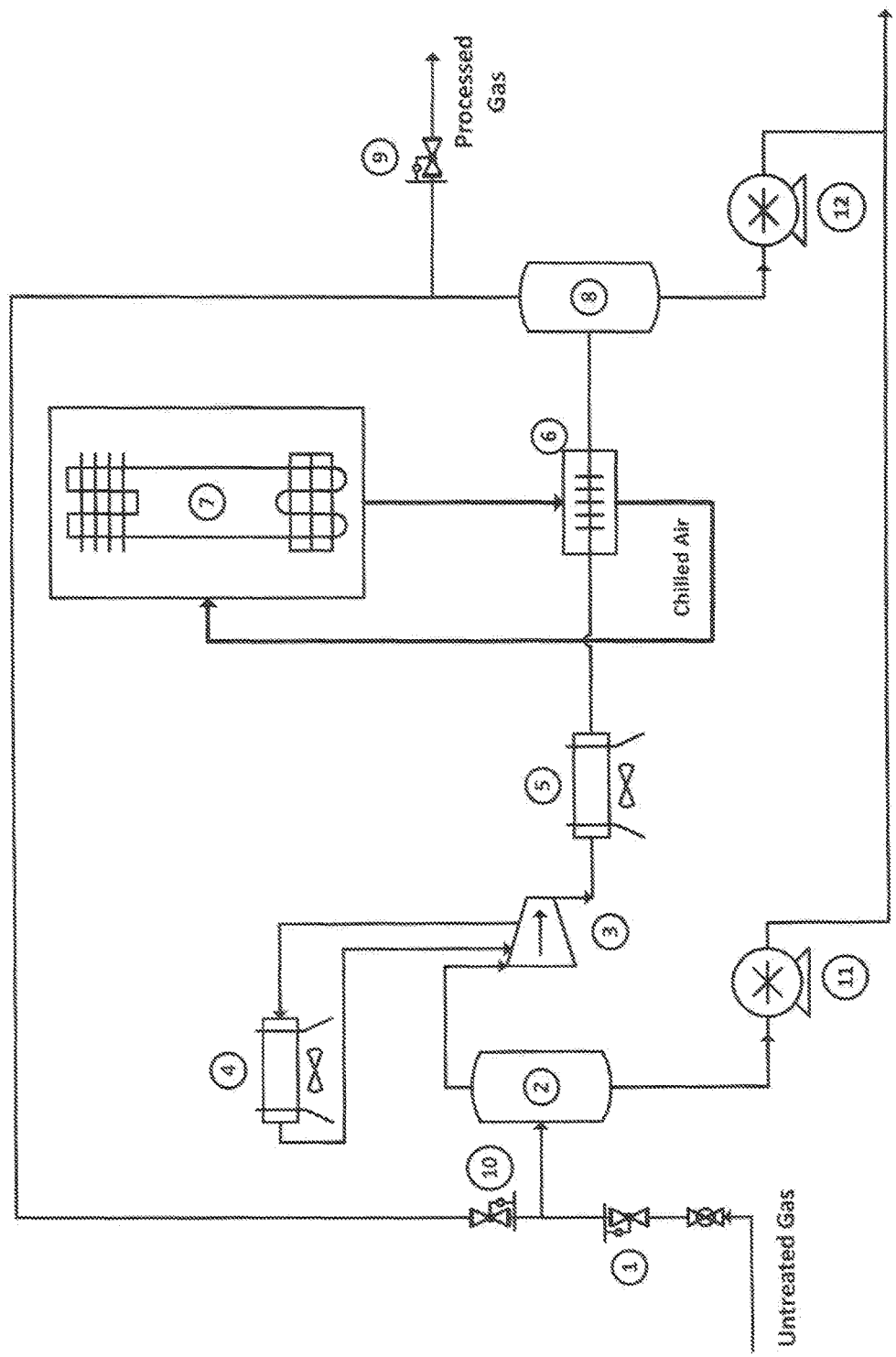
FIG. 1 is a system architecture diagram of the present invention.

As shown in FIG. 1, untreated gas first passes through a pressure regulator 1, if necessary, to reduce the pressure of the untreated gas to one suitable for the inlet of the compressor. From here, the untreated gas passes through a scrubber 2 that will remove any liquid droplets or contaminants prior to compression. The untreated gas then enters the compressor 3, where the pressure of the gas is increased to the setpoint of the process, creating pressurized gas. (At this stage, the temperature of the gas is also increased as a result of the compression.) If oil-flooded screw compression is used, the oil will be separated from the gas at the tail end of the compression stage and then cooled 4. From here, the pressurized gas will pass through an aerial cooler 5, where heat will be discharged to the atmosphere. This cooler may be controlled via an onboard controller and feedback from a temperature transducer, if needed. After the aerial cooler 5, the pressurized gas will pass through the chilled air exchanger 6. Here the gas is cooled to a selected setpoint by circulation of chilled air to create cooled pressurized gas.

The air is chilled in the air chilling unit 7, and the pressurized gas is cooled in the chilled air exchanger 6. As noted above, the system may be open-loop or closed-loop. In an open-loop system, atmospheric air is chilled in the air chilling unit 7 to a setpoint; in a closed-loop system, non-pressurized air in the ducting (present in the ducting when the system is installed) is chilled in the air chilling unit 7 to a setpoint. The air that is chilled by the air chilling unit 7 is directed via ducting to the chilled air exchanger 6. The setpoint of the chilled air exchanger 6 is adjusted by controlling the air chilling unit setpoint and/or the aerial cooler fan speed.

Next, the cooled pressurized gas flows to a separator 8, where liquids formed during the cooling process are removed, creating processed gas. The processed gas then either crosses a backpressure valve 9 and proceeds to its end disposition or passes through a recycle valve 10 in the event that the quantity of gas available for compression is less than that which the compressor is trying to draw. The backpressure valve 9 senses pressure in the system and will increase or decrease the size of the valve opening to maintain pressure within the system. The recycle valve 10 is set to sense pressure at the scrubber 2 at the compressor inlet and will increase and decrease its opening size to maintain pressure and flow at the compressor 3 in the event that raw gas quantity is reduced. Liquids produced at the scrubber 2 or the separator 8, are pumped to storage or disposal by pumps 11 and 12.

In the present invention, by decoupling the refrigeration from the natural gas heat exchanger through the use of air as an intermediate chilling fluid, greater consistency in process temperature and greater refrigeration reliability are realized by separating the variable heat load of the natural gas from the refrigeration evaporator. Conventional refrigeration systems require direct heat exchange between the refrigeration evaporator and the natural gas and can experience reliability issues with a varying natural gas heat load. By using air rather than other intermediary fluids, the system is less mechanically and electrically complex and therefore less expensive. In a conventional chilling system, chilling fluids can be prone to freezing, may require added environmental precautions, require additional pumping power, add extra weight to the system, and may require added material selection considerations.

Figure 2:
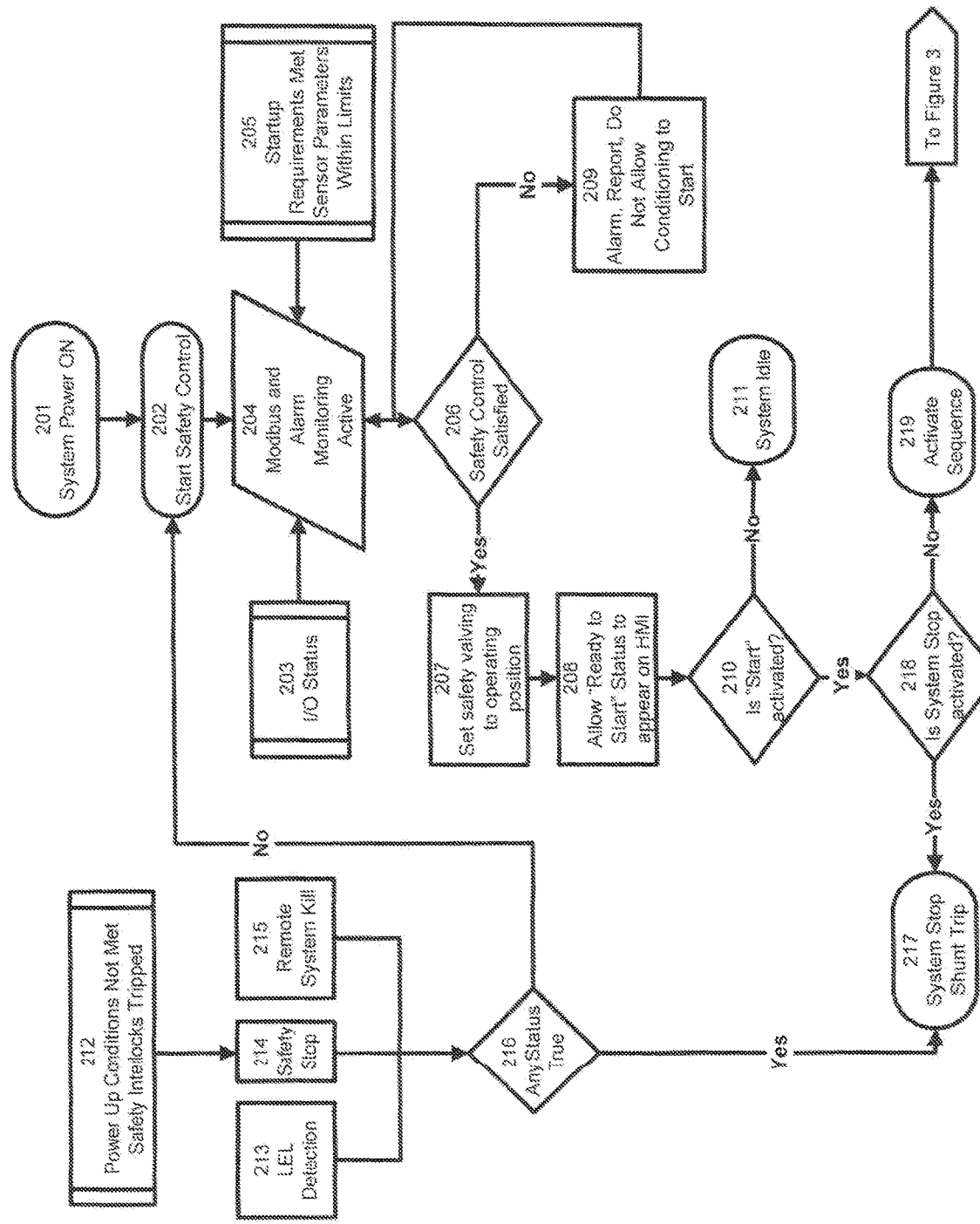
FIG. 2 is a first flow diagram of the programming sequence of the present invention.

FIGS. 2 through 6 are flow diagrams of the programming sequence of the present invention. As shown in FIG. 2, when initial power is applied, the controller begins the Boot-Up process 201. The controller then initializes the monitor for correct configuration and begins checking safety stop interlocks, combustible gas detection, and remote modbus values. If all initial values are within allowed parameters, the controller allows system startup 202. Both analog and digital inputs and outputs used for control and operational decisions are used by the controller. Discrete switch positions, analog temperatures, valve positions, and pressures are monitored by the controller 203. The controller continually monitors conditions to ensure ongoing safe operation 204. At step 205, the controller assesses whether start-up requirements have been met based on both operator input (for example, as to system configuration and parameters for high and low limits) and sensor parameters (for example, regarding the state of the system).

If all preceding safety criteria are satisfied, the system transitions from startup to processing 206. As long as the safety control 206 is satisfied, the safety valve 207 will set to its operating position, and the "Ready to Start" icon will appear on the human-machine interface (HMI), 208. The system can stay in this mode indefinitely until the start icon is toggled. If at any time the safety status is no longer satisfied, the "Ready to Start" icon disappears, and the alternate path 209 is invoked until the issues are cleared 207. In the event that the safety control is no longer satisfied, alarms are generated, and a report is cued for send out to the remote monitoring network. An inhibit is also fed back into the process to prevent startup or continued operation 209, and at that point, the controller monitors the status of the "Ready to Start" bit 210.

If the system is ready to run (i.e., the "Ready to Start" icon appears), but the "Ready to Start" icon has not been pressed, the process will remain in "idle" mode indefinitely 211. Hardware safety interlocks must be satisfied to allow power to be applied to the system. This includes level switches, emergency stop push button switches, and lock out/tag out switches 212. A combustible gas detection (CGD) sensor is located in the same physical electrical enclosure as the controller. The CGD sensor monitors for a threshold of 20% or greater of the lower explosive limit (LEL) to send a shutdown notice 213. Any of the safety interlocks from box 211 that fail will send a shutdown notice 214 to the controller, which then initiates the shutdown process. The remote telemetry service (i.e., satellite connection) is also capable of sending a shutdown notice 215 to the controller.

If one of these inputs 213, 214, 215 shows a fault in startup 216, the controller sends a signal to shunt trip the main breaker to shut down the system 217. These three inputs are monitored by the controller whenever the system is in operation. The controller also monitors the system stop button 218. At any time, if the system stop 218 is pressed after a start command has been initiated, the controller sends a signal to shunt trip the main breaker to shut down the system. If the start command has been initiated 210, and there are no faults in startup, the sequence to transition from startup to raw gas conditioning 219 is activated.

Figure 3:
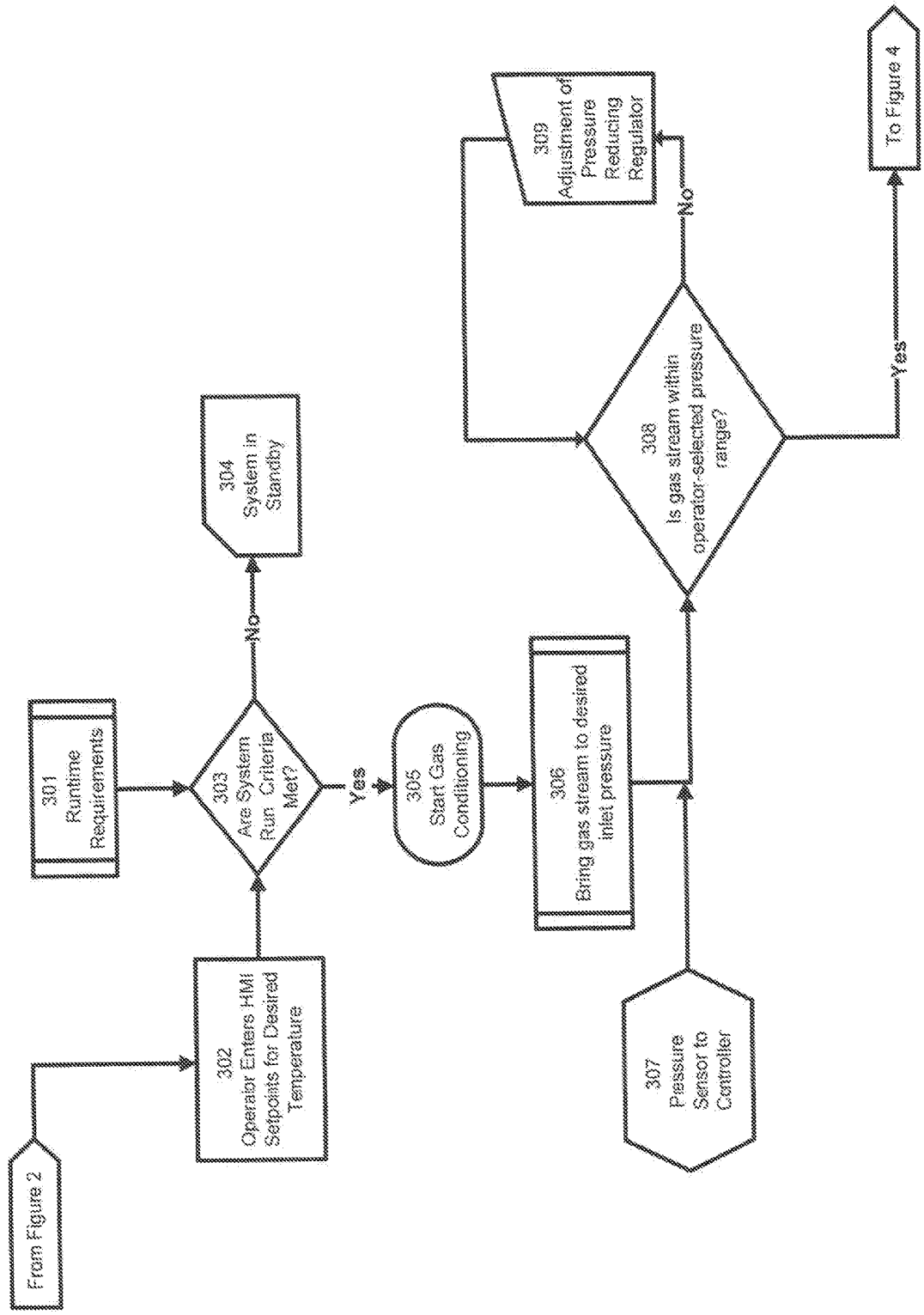
FIG. 3 is a second flow diagram of the programming sequence of the present invention.

As shown in FIG. 3, there are additional criteria that must be met beyond the startup requirements in order for the system to proceed past the "idle" or "standby" state. These criteria include reservoir oil, chilling fluid temperature, liquid levels, or deltas between ambient and media (gas stream) values 301. These values may not necessitate a system shutdown, but they may require suspension of system operation until the values are within an acceptable range. On the HMI, the operator will input the required parameters and setpoints 302 specific to the wellsite, including, but not limited to, temperature of the chilling air.

As noted in the preceding paragraph, a preconfigured list of runtime requirements must be met before starting the raw gas conditioning 303. The system can stay in standby mode waiting for values to come into compliance with requirements 304. When all requirements—both startup (see FIG. 2) and runtime 301—are met, the controller will activate the compressor and inlet pressure reduction 305 to bring the gas stream to a predictable pressure by throttling through a pressure reducing valve 306. A sensor 307 reads the gas inlet pressure and transmits that data to the controller to ensure that the untreated gas reaches the setpoint pressure 308. If the untreated gas is already below the pre-selected pressure, the pressure reducing valve is left open. If needed, the controller will either adjust the pressure reducing valve or signal the operator to adjust the valve 309.

Figure 4:
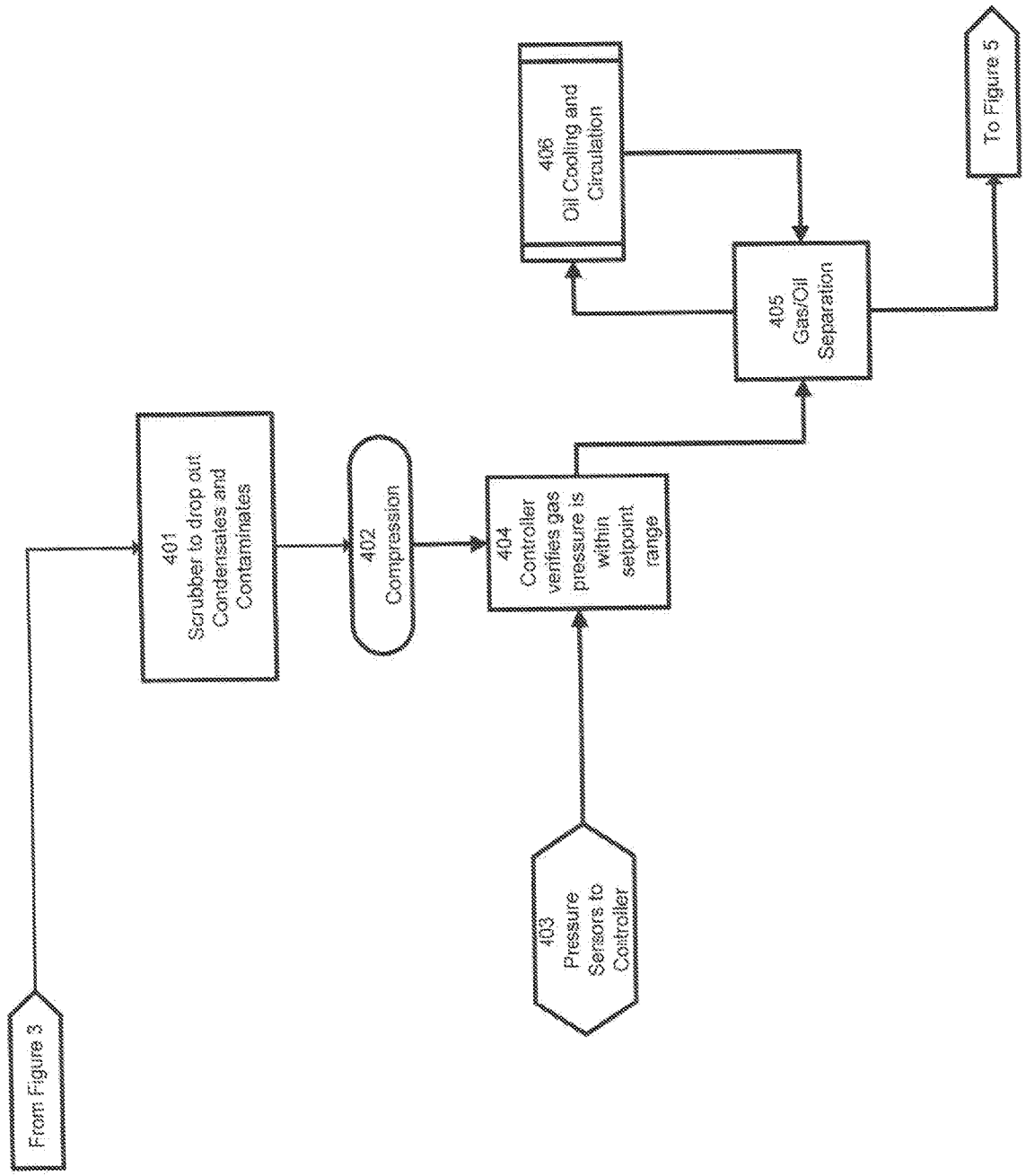
FIG. 4 is a third flow diagram of the programming sequence of the present invention.

As shown in FIG. 4, untreated gas enters the scrubber to remove condensates and contaminates from the gas stream 401. Compression of the gas may be effectuated by using any type of compressor (e.g., screw compressors, reciprocating compressors, centrifugal compressors, etc.) 402. Pressure sensors 403 are used by the controller to verify that the gas is compressed to within the setpoint range set by the operator 404. From here, if the untreated gas is compressed by an oil flooded screw to become pressurized gas, the pressurized gas undergoes separation from compressor oil 405 with the oil stream being returned to cooling and circulation through the compressor 406.

Figure 5:
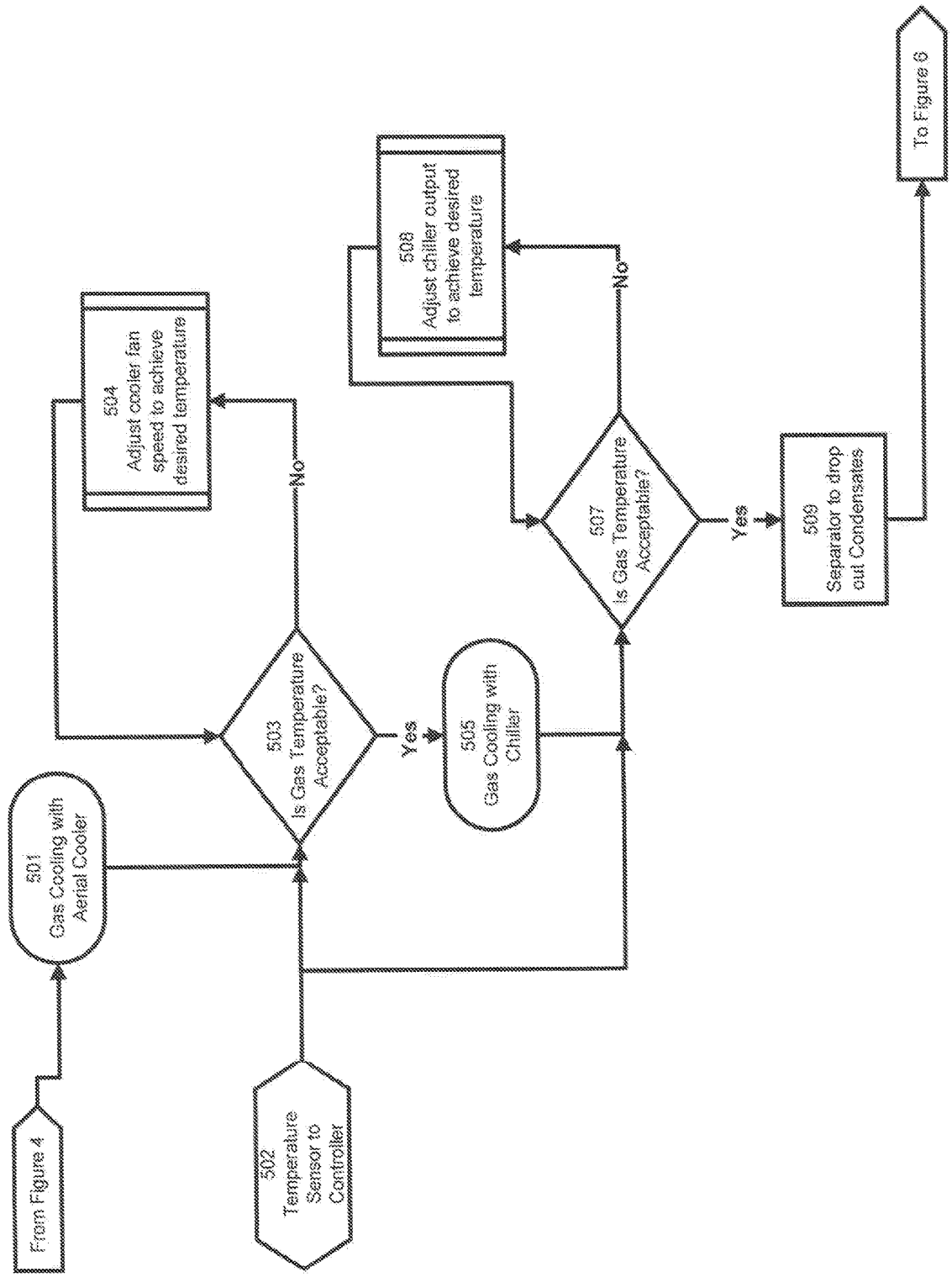
FIG. 5 is a fourth flow diagram of the programming sequence of the present invention.

As shown in FIG. 5, hot pressurized gas is first cooled with an aerial cooler 501. A temperature sensor 502 sends data to the controller to determine whether the pressurized gas is at setpoint for this step of the process 503. The controller will then adjust the fan speed of the aerial cooler using a variable frequency drive (VFD) 504. From here, the pressurized gas enters the chiller unit 505, where the gas is cooled to the operator setpoint. The controller collects data from temperature sensors 502 and determines whether the desired setpoint is being met 507. If further adjustment of cooling is required, the controller will adjust the chiller output 508 to achieve the desired gas temperature. Both the chiller and aerial cooler can be controlled by the controller to optimize performance and maintain the operator input setpoint. From here, gas that has now formed liquids is sent to a separator to remove condensates 509, forming processed gas.

Figure 6:
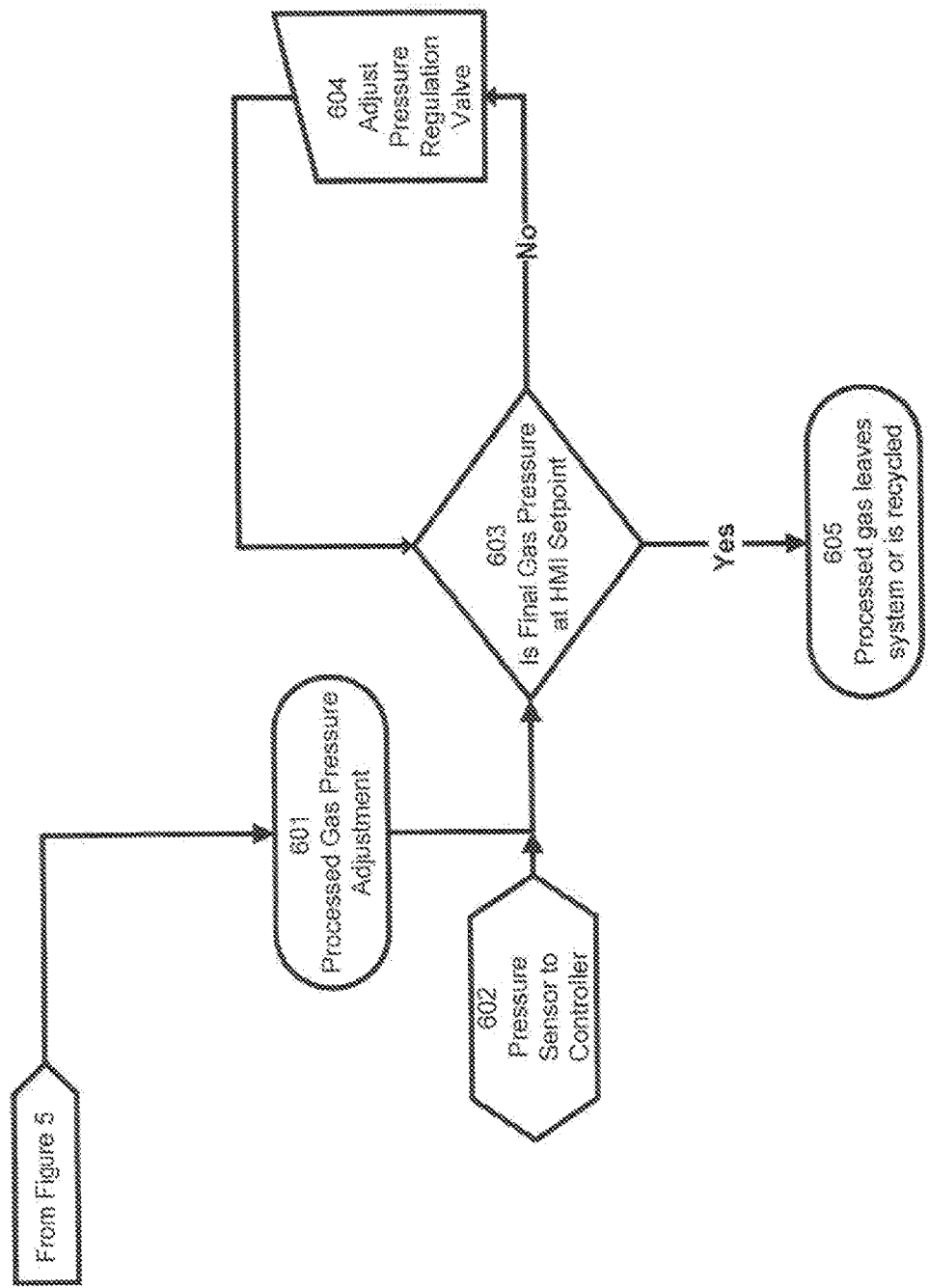
FIG. 6 is a fifth flow diagram of the programming sequence of the present invention.

As shown in FIG. 6, processed gas pressure adjustment is performed by the system backpressure valve 601. The pressure of the gas is read by sensors 602, and the controller determines whether the gas is at the input setpoint 603. If the gas is not at its setpoint pressure, the controller adjusts the pressure regulation valve, or the operator will adjust a manual valve based on the reading provided by the HMI 604. From here, processed gas is released from the system or can be internally recycled 605.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method for removing natural gas liquids from raw natural gas comprising:
   (a) passing untreated gas through a scrubber to remove liquid droplets and contaminants;
   (b) delivering the untreated gas that has passed through the scrubber to a compressor, which pressurizes the untreated gas to create pressurized gas;
   (c) passing the pressurized gas from the compressor through a first aerial cooler to discharge heat to atmosphere;
   (d) providing a chilled air exchanger and an air chilling unit;
   (e) chilling air by passing the air through the air chilling unit to create chilled air;
   (f) delivering the chilled air to the chilled air exchanger;
   (g) passing the pressurized gas from the first aerial cooler through the chilled air exchanger to cool the pressurized gas to a setpoint to create cooled pressurized gas; and
   (h) delivering the cooled pressurized gas to a separator to remove liquids from the cooled pressurized gas, thereby creating processed gas.

2. The method of claim 1, further comprising the step of passing the untreated gas through a pressure regulator to reduce pressure of the untreated gas to a setpoint prior to delivery of the untreated gas to the compressor.

3. The method of claim 1, further comprising the step of: wherein the compressor is an oil-flooded screw compressor, separating oil from the pressurized gas to create separated oil and cooling the separated oil via a second aerial cooler.

4. The method of claim 1, wherein the air that is chilled in the air chilling unit is atmospheric air.

5. The method of claim 1, wherein the air that is chilled in the air chilling unit is contained within ducting and circulated within a closed loop.

6. The method of claim 1, further comprising the step of passing the processed gas through a backpressure valve prior to delivering the processed gas to an end disposition.

7. The method of claim 1, further comprising the step of passing the processed gas through a recycle valve that is configured to sense pressure at the scrubber and at an inlet to the compressor and to increase and decrease an opening size of the recycle valve to maintain pressure and flow at the compressor in the event that raw gas quantity is reduced.

8. The method of claim 1, further comprising the step of pumping to storage liquids produced at the scrubber and at the separator.

9. The method of claim 1, further comprising the step of pumping to disposal liquids produced at the scrubber and at the separator.

10. The method of claim 1, further comprising the step of controlling the setpoint of the chilled air exchanger by adjusting a setpoint of air chilling unit.

11. The method of claim 1, further comprising the step of:
   wherein the first aerial cooler comprises a fan, controlling the setpoint of the chilled air exchanger by adjusting the speed of the fan of the first aerial cooler.

* * * * *